United States Patent

Niessner et al.

Patent Number: 5,219,907
Date of Patent: Jun. 15, 1993

[54] FLAMEPROOFED MOLDING COMPOSITION

[75] Inventors: Norbert Niessner, Friedelsheim; Rainer Neumann, Mutterstadt; Karl Ruppmich, Ludwigshafen; Friedrich Seitz, Friedelsheim; Doris Zeltner, Roemerberg, all of Fed. Rep. of Germany

[73] Assignee: BASF Aktiengesellschaft, Ludwigshafen, Fed. Rep. of Germany

[21] Appl. No.: 950,498

[22] Filed: Sep. 25, 1992

[30] Foreign Application Priority Data

Sep. 27, 1991 [DE] Fed. Rep. of Germany ....... 4132264

[51] Int. Cl.$^5$ .................. C08K 5/523; C08L 51/06
[52] U.S. Cl. .................. 524/140; 524/141; 524/143; 525/67; 525/72; 525/209; 525/902; 526/276; 526/277
[58] Field of Search .......... 524/140, 143, 141; 525/72, 209, 902, 67; 526/277, 276

[56] References Cited

U.S. PATENT DOCUMENTS

| | | | |
|---|---|---|---|
| 3,932,321 | 1/1976 | Maki et al. | 526/277 |
| 4,224,419 | 9/1980 | Swoboda et al. | 525/71 |
| 4,315,081 | 2/1982 | Kobayashi et al. | 525/67 |
| 4,692,488 | 9/1987 | Kress et al. | 524/141 |
| 4,876,313 | 10/1989 | Lorah | 525/902 |
| 4,883,835 | 11/1989 | Buysch et al. | 524/141 |
| 4,914,144 | 4/1990 | Muehlbach et al. | 524/141 |
| 4,920,166 | 4/1990 | Buysch et al. | 524/141 |
| 4,925,891 | 5/1990 | Kress et al. | 524/141 |
| 4,983,658 | 1/1991 | Kress et al. | 524/141 |
| 4,988,748 | 1/1991 | Fuhr et al. | 524/141 |
| 5,030,675 | 7/1991 | Wittmann et al. | 524/141 |
| 5,036,126 | 7/1991 | Rinehart et al. | 524/141 |
| 5,061,745 | 10/1991 | Wittmann et al. | 524/141 |
| 5,082,890 | 1/1992 | Chou et al. | 524/451 |
| 5,137,953 | 8/1992 | Fuhr et al. | 524/141 |
| 5,147,940 | 9/1992 | Biale | 525/902 |
| 5,157,065 | 10/1992 | Fuhr et al. | 524/141 |

FOREIGN PATENT DOCUMENTS 3523316 1/1987 Fed. Rep. of Germany.
1124911 8/1968 United Kingdom.

Primary Examiner—Veronica P. Hoke
Attorney, Agent, or Firm—Keil & Weinkauf

[57] ABSTRACT

A flame retardant molding composition contains a halogen-free polycarbonate at least one halogen-free graft copolymer assembled from copolymerized units of an elastomer and certain ethylenically unsaturated monomers which include 1-50% by weight of an organic phosphorus compound of the formula (I)

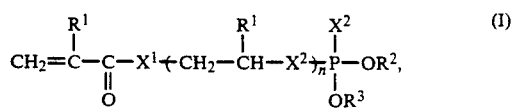

a halogen-free thermoplastic copolymer comprising styrene, α-alkylstyrene, nuclear-substituted styrene and/or $C_1$–$C_8$-alkyl (meth)acrylate, and (meth)acrylonitrile and/or maleic anhydride, as well as 1–46% by weight of a halogen-free phosphorus compound of the formula (I): Optionally a monophosphate additive and up to 5% by weight of a polytetrafluoroethylene with a median particle size of from 0.05 to 20 μm may be added.

2 Claims, No Drawings

FLAMEPROOFED MOLDING COMPOSITION

The present invention relates to a flameproofed chlorine- and bromine-free molding composition composed of polycarbonate and a graft copolymer of a rubber-like grafting base and a shell, and of the relevant hard matrix, namely poly(styrene-co-acrylonitrile).

Bromine- and chlorine-free flameproofing of PC/ABS and PC/ASA. blends is known and described, for example, in the following publications
(1) DE-A 35 23 314
(2) DE-A 35 23 316
(3) DE-A 38 19 081
(4) DE-A 38 24 356
(5) DE-A 36 28 904
(6) EP-A 287 895
(7) EP-A 286 965

Employed besides organic phosphates for the flameproofing are fiber-forming PTFE polymers. Although blends of this type have a good flame-retardant action, their notched impact strength is inadequate. In addition, the amount of organic phosphorus compounds needed for classification as UL 94 results in a considerable reduction in the heat resistance. For this reason, (4) proposes specific phosphates which ensure an increased Vicat softening point despite the flameproofing being good: these specific phosphates are, however, not commercially available and are elaborate to prepare. In addition, blends containing these phosphates still have insufficient notched impact strengths.

Phosphates which have vinyl double bonds and can undergo free-radical polymerization are commercially available and can, according to the manufacturers, be employed for flameproofing. However, nothing is known about their effect in PC/ABS and PC/ASA blends. The phosphates employed for flameproofing normally have to have a certain volatility because, otherwise, they have no flame-retardant properties.

The molding composition contains the following amounts of the components, in each case based on the total of components A+B+C+D+E,
A) 40–90, preferably 50–85, % by weight
B) 40–90, preferably 50–85, % by weight
C) 5–40, preferably 6–25, % by weight
D) 0–20, preferably 2–15, % by weight
E) 0–5, preferably 0.01–2, % by weight Up to 80% by weight of additives, based on the molding compositions composed of A to E, can also be present.

The present invention therefore primarily relates to a flameproofed chlorine- and bromine-free molding composition with high heat resistance and good notched impact strength, containing, based on the total of A to E, A: 40–90% by weight of a halogen-free polycarbonate A, B: 5–40% by weight of at least one halogen-free graft copolymer B assembled from copolymerized units (based on B) of B1: 40–80% by weight of an elastomer B1 with a glass transition temperature below 0° C., B2: 20–60% by weight of a shell B2 of, based on B2, B21: 40–98% by weight of styrene, α-methylstyrene, nuclear-substituted styrene and/or $C_1$–$C_8$-alkyl (meth)acrylate, B22: 50–1% by weight of (meth)acrylonitrile and/or maleic anhydride, B23: 1–50% by weight of an organic phosphorus compound of the formula (I)

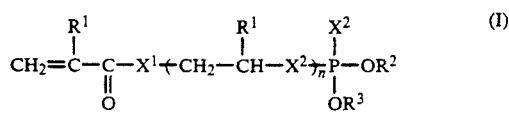

where
$R^1$ is H or $CH_3$,
$R^2$ and $R^3$ are each independently halogen-free $C_1$–$C_8$-alkyl or halogen-free unsubstituted or substituted $C_6$–$C_{20}$-aryl,
$X^1$, $X^2$ and $X^3$ are each O, S, NR (where R is hydrogen or halogen-free $C_1$–$C_8$-alkyl) and
n is 0 to 10

C: 5–40% by weight of a halogen-free thermoplastic copolymer C of, based on C,

C1: 50–95% by weight of styrene, α-alkylstyrene, nuclear-substituted styrene and/or $C_1$–$C_8$-alkyl (meth)acrylates, C2: 4–50% by weight of (meth)acrylonitrile and/or maleic anhydride, C3: 1–46% by weight of a halogen-free phosphorus compound of the formula (I), D: up to 20% by weight of a halogen-free phosphorus compound of the formula (II)

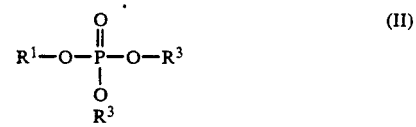

where $R^1$, $R^2$ and $R^3$ are each independently halogen-free $C_1$–$C_8$-alkyl or halogen-free unsubstituted or substituted $C_6$–$C_{20}$-aryl, E: up to 5% by weight of a polytetrafluoroethylene with a median particle size of from 0.05 to 20 μm.

A molding composition according to the invention preferably has the following composition:
50–85% by weight of A,
5–25% by weight of B,
5–40% by weight of C,
4–15% by weight of D,
0.01–2% by weight of E.

The elastomer B1 is preferably polybutadiene or a crosslinked polyacrylate rubber of (based on B11+B12)

B11: 70–99.9% by weight of at least one $C_4$–$C_8$-alkyl acrylate B11,

B12: 0–29.9% by weight of at least one other copolymerizable monoethylenically unsaturated monomer, B13: 0.1–15% by weight of at least one polyfunctional crosslinking monomer B12.

COMPONENT A

Thermoplastic, halogen-free aromatic polycarbonates which are suitable according to the invention are those based on diphenols of the formula

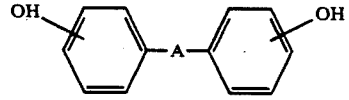

where A is a single bond, $C_1$–$C_3$-alkylene, $C_2$–$C_3$-alkylidene, $C_3$–$C_8$-cycloalkylidene, —S— or —$SO_2$—.

Polycarbonates suitable according to the invention as component A are both homopolycarbonates and copolycarbonates.

The diphenols of the formula (I) either are known from the literature or can be prepared by processes known from the literature.

The preparation of the polycarbonates suitable according to the invention as component A is known from the literature and can be carried out, for example, with phosgene by the phase-transfer process or with phosgene by the homogeneous phase process (the pyridine process), the required molecular weight being obtained in each case in a conventional manner by an appropriate amount of known chain terminators. (Concerning polydiorgano-siloxane-containing polycarbonates, see, for example, DE-A 33 34 782).

Examples of suitable chain terminators are phenol, p-tert.-butylphenol and long-chain alkyl phenols such as 4-(1,1,3,3-tetramethylbutyl)phenol according to DE-A 28 42 005, or monoalkylphenols or dialkylphenols with a total of 8 to 20 carbons in the alkyl substituents according to German Patent Application P 35 06 472.2 (Le A 23 654), such as p-nonylphenol, 3,5-di-tert.-butylphenol, p-tert.-octylphenol, p-dodecylphenol, 2-(3,5-dimethylheptyl)phenol and 4-(3,5-dimethylheptyl)phenol.

The polycarbonates suitable according to the invention as component A have relative viscosities $\eta_{rel}$ of from 1.10 to 1.50, in particular from 1.25 to 1.40. These correspond to average molecular weights $M_w$ of from 10,000 to 200,000, preferably from 20,000 to 80,000.

Examples of suitable diphenols of the formula (I) are hydroquinone, resorcinol, 4,4'-dihydroxybiphenyl, 2,2-bis(4-hydroxyphenyl)propane, 2,4-bis(4-hydroxyphenyl)-2-methylbutane and 1,1-bis(4-hydroxyphenyl)-cyclohexane.

Preferred diphenols of the formula (I) are 2,2-bis(4-hydroxyphenyl)propane and 1,1-bis(4-hydroxyphenyl)-cyclohexane.

The polycarbonates suitable according to the invention as component A can be branched in a conventional manner, preferably by incorporating from 0.05 to 2.0 mol %, based on the total of diphenols employed, of compounds with three or more functional groups, for example phenolic OH groups.

Preferred polycarbonates are, beside bisphenol A homopolymer, the copolycarbonates of bisphenol A.

For the purpose of the present invention, halogen-free polycarbonates mean polycarbonates which are assembled from halogen-free diphenols and halogen-free chain terminators with or without halogen-free branches, but contents in the low ppm range of hydrolyzable chlorine resulting, for example, from the preparation of the polycarbonates with phosgene by the phase-transfer process are not regarded as a halogen content for the purpose of the present invention. Polycarbonates of this type with ppm contents of hydrolyzable chlorine are halogen-free polycarbonates for the purpose of the present invention.

The graft copolymers B are known as ABS or ASA rubbers.

These ABS graft copolymers are assembled from, in each case based on B, a polybutadiene rubber B1 as elastomer component, which comprises 40–80% by weight, and a shell B2 grafted thereon, which comprises 20–60% by weight. Suitable rubbers are polybutadiene (cf. DE-A 14 20 775 and DE-A 14 95 089) and copolymers of butadiene and styrene (cf. GB-C 649 166). The rubber B1 should have a glass transition temperature (method of K. H. Illers and H. Breuer, Colloid-Z. 167 (1961), 110) which is below −40 C., preferably below −60° C.

The shell B2 is assembled from, in each case based on B2, 40–98% by weight of styrene, α-methylstyrene, nuclear-alkylated styrene or $C_1$–$C_8$-alkyl (meth)acrylate, 1–50% by weight of (meth)acrylonitrile or maleic anhydride, and 1–50% by weight of the organic phosphorus compound of the formula (I).

The graft copolymerization can be carried out in a conventional way in solution, suspension or, preferably, in emulsion. The soft phase of the graft copolymer has, in the preferred preparation of the rubber and the grafting in emulsion, a median particle diameter ($d_{50}$ of the cumulative mass distribution) of 0.08 μm. The $d_{50}$ is adjusted in the range from 0.2 to 0.5 μm by enlarging the particles, e.g. by agglomeration or by obtaining the emulsion by the seed latex process. In graft copolymerizations of this type there is at least partial chemical linkage of the polymerizing monomers to the rubber which has already polymerized, the linkage probably taking place on the double bonds present in the rubber. Thus, at least part of the monomers are grafted onto the rubber, i.e. covalently bonded to the linear molecules thereof.

The grafting can also take place in several stages by grafting on first a portion of the monomers forming the shell and subsequently the remainder.

The structure and the preparation of ASA rubbers are described, for example, in DE-A 28 26 925, 31 49 358 and 34 14 118.

COMPONENT B

Component B is preferably formed from:
B1: at least one elastomer (rubber) comprising 40–80% by weight of B) and composed of a monomer mixture of
B11: 70–99.9% by weight, based on B1, of at least one $C_1$–$C_8$-alkyl acrylate,
B12: 0–30% by weight, based on B1, of at least one other copolymerizable monoethylenically unsaturated monomer and
B13: 0.1–5% by weight, based on B1, of a copolymerizable polyfunctional crosslinking monomer and
B2: a shell which is grafted onto this elastomer, comprises 20–60% by weight of B) and is assembled from
B21: 40–98% by weight of styrene, α-methylstyrene nuclear-substituted styrene, $C_1$–$C_8$-alkyl (meth)acrylate or mixtures thereof, and
B22: 50–1% by weight of (meth)acrylonitrile, maleic anhydride or mixtures thereof,
B23: 50–1% by weight of an organic phosphorus compound of the formula I.

Suitable monomers for preparing the elastomer B1 are:
B11: 70–99.9% by weight, preferably 99% by weight, based on B1, of a $C_1$–$C_8$-alkyl acrylate, preferably using n-butylacrylate and/or 2-ethylhexyl acrylate, especially n-butylacrylate as sole alkyl acrylate.
B12: The elastomeric polymer B1 may also contain up to 30, in particular 20–30, % by weight, in each case based on B1, of another copolymerizable monomer B12 such as butadiene, isoprene, styrene, acrylonitrile, methylmethacrylate and/or vinyl methyl ether.
B13: In order to obtain crosslinked polyacrylates, the polymerization of the acrylates is carried out in the presence of 0.1–5% by weight, preferably 1–4% by weight, based on the total monomers employed in the preparation of the grafting base, of a copolymerizable polyfunctional, preferably bi- or tri-functional, crosslinking monomer B13. Suitable bi- or polyfunctional crosslinking monomers B13 are those which preferably contain two, possibly also three or more, ethylenic double bonds which are capable of copolymerization and are not 1,3-conjugated. Examples of suitable crosslinking monomers are divinylbenzene, diallyl maleate, diallyl fumarate, diallylphthalate, triallyl cyanurate or triallyl isocyanurate. A particularly suitable crosslinking monomer has proven to be the acrylic ester of tricyclodecenyl alcohol (cf. DE-C 12 60 135).

The rubbers are present in the graft copolymers B) in the form of at least partially crosslinked particles with a median particle size of 50–700 nm ($d_{50}$ the cumulative mass distribution).

In order to achieve this, the particles of the rubber are enlarged in a conventional manner, e.g. by agglomeration, so that the latex has a bimodal structure (50–180 nm and 200–700 nm). However, it is also possible to prepare directly a large-particle rubber dispersion by a seed process.

The graft copolymer B can be prepared, for example, by the method described in DE-C 12 60 135.

The shell of the graft copolymer can be assembled in one or two stages, and the large-particle product is preferably assembled (grafted) in two stages.

When the shell B2 is assembled in two stages, the 1st stage comprises 20–70%, preferably 25–50%, of the weight of B2. It is prepared using only monoethylenically unsaturated aromatic hydrocarbons with up to 12 carbons for B21.

The 2nd stage of the shell comprises 30–80%, in particular 50–75%, of the weight of B2. It is prepared by using mixtures of the said monoethylenically unsaturated aromatic hydrocarbons B21 and monoethylenically unsaturated monomers B22 in the ratio B21/B22 of from 90:10 to 60:40, in particular 80:20 to 70:30, by weight.

Monomer mixtures which are particularly preferably empolyed are styrene and acrylonitrile, α-methylstyrene and acrylonitrile, styrene, acrylonitrile and methyl methacrylate, styrene and maleic anhydride.

The amounts of ungrafted copolymers produced from the monomers B21 and/or B22 in the preparation of the graft copolymer B) are assigned to component B for the purpose of the present invention.

The conditions for the graft copolymerization should be chosen so that the resulting particles have sizes from 60 to 1000 nm ($d_{50}$ of the cumulative mass distribution). Measures to achieve this are known and described, for example, in DE-C 12 60 135 and DE-A 28 26 925.

For products of maximum toughness it is often an advantage to use a mixture of at least two graft copolymers with different particle sizes.

The two graft copolymers B1 and B2 preferably have the same chemical structure although the shell of the large-particle graft copolymer can, in particular, be assembled in two stages.

In a preferred embodiment, a mixture of two graft copolymers with particle diameters ($d_{50}$ of the cumulative mass distribution) of 50–180 nm and 200–700 nm are employed in the ratio of from 70:30 to 30:70 by weight.

Mixtures of components A and B in which the latter has a large-particle and a fine-particle graft copolymer are described, for example, in DE-A 36 15 607. Mixtures of components A and B in which the latter has a two-stage shell are disclosed in EP 111 260.

COMPONENT C

Preferred halogen-free copolymers as component C are those composed of at least one monomer from the series comprising styrene, α-alkylstyrene, especially α-methylstyrene, nuclear-alkylated styrenes, especially p-methylstyrene, $C_1$–$C_8$-alkyl (meth)acrylate, especially methyl methacrylate with at least one monomer from the series comprising acrylonitrile, methacrylonitrile, methyl methacrylate, maleic anhydride and at least one of the polymerizable phosphates of the formula (I).

The copolymers C are resinous, thermoplastic and rubber-free. Particularly preferred copolymers C are those of styrene with acrylonitrile, with or without methyl methacrylate, of α-methylstyrene with acrylonitrile, with or without methyl methacrylate, or of styrene and of α-methylstyrene with acrylonitrile, with or without methyl methacrylate, and of styrene and maleic anhydride.

COMPONENT D

The halogen-free phosphorus compounds D suitable according to the invention are generally known (see, for example, Ullmann, Enzyklopädie der technischen Chemie, Vol. 18, pages 301 et seq., 1979; Houben-Weyl, Methoden der organischen Chemie, Vol. 12/1, pages 43 and 136; Beilstein, Vol. 6, page 177).

Examples of phosphorus compounds D of the formula (II) suitable according to the invention are tri(2,6-dimethylphenyl) phosphate, triphenyl phosphate, tricresyl phosphate, diphenyl 2-ethylcresyl phosphate, diphenyl cresyl phosphate and tri(isopropylphenyl) phosphate.

In order to increase the Vicat softening point of the mixtures, it is also possible to employ mixtures of the abovementioned phosphates with, for example, triphenylphosphine oxide or tri(2,6-dimethylphenyl)phosphine oxide.

Also suitable for increasing the Vicat softening point of the mixtures are the phosphates mentioned in DE-A 38 24 356, such as diphenyl 4-phenylphenyl phosphate phenyl di(4-phenylphenyl) phosphate tri-(4-phenylphenyl) phosphate diphenyl 4-benzylphenyl phosphate phenyl di(4-benzylphenyl) phosphate tri(4-benzylphenyl) phosphate phenyl di[4-(1-phenylethyl)phenyl] phosphate phenyl di[4-(1-phenylethyl)-2,6-dimethylphenyl] phosphate.

COMPONENT E

The polytetrafluoroethylenes suitable according to the invention (Component E) are polymers with fluorine contents of 65–76% by weight, preferably 70–76% by weight. Examples include polytetrafluoroethylene, tetrafluoroethylene/hexafluoropropylene copolymers or tetrafluoroethylene copolymers with small amounts of fluorine-free copolymerizable ethylenically unsaturated monomers. Polymers of this type are known. They can be prepared by conventional processes, for example by polymerization of tetrafluoroethylene in aqueous medium with a free radical-forming initiator, for example sodium, potassium or ammonium peroxydisulfate, under a pressure of 7.71 kg/m² and at 0–200° C., preferably 20–100° C. (for details, see U.S. Pat. No. 2,393,967, for example).

The polytetrafluoroethylenes suitable according to the invention have median particle sizes of 0.05–20 μm, preferably 0.08–10 μm and a density of 1.2–1.9 g/cm³. Addition of polytetrafluoroethylenes reduces or entirely prevents, in particular, particles dropping off the molding compositions when they are burning.

The aqueous PTFE dispersion can be either absorbed onto the granules in a fluid mixer or incorporated into a melt of Component C in an extruder with vent.

It is also possible for emulsions of Component B to be combined with emulsions of Component F and precipitated using salt solution.

COMPONENT F

The molding composition can also contain conventional additives, for example
carbon fibers
glass fibers etc.

The glass fibers can be of low or high alkali glass or C glass. They are preferably treated with a size and an adhesion promoter. Their diameter is generally from 6 to 20 μm. It is possible to employ both continuous strands (rovings) and chopped strands with a length of 1–10 mm, preferably 3–6 mm.

Fillers or reinforcing agents such as glass beads, mineral fibers, whiskers, alumina fibers, mica, silica flour, wollastonite etc.

Metal flakes (e.g. aluminum flakes supplied by Transmet Corp.), metal powders, metal fibers, metal-coated fillers (e.g. nickel-coated glass fibers) and other additives which screen electromagnetic waves. Particularly suitable are Al flakes (K 102 supplied by Transmet) in amounts of 30–70 parts by weight based on the flame-resistant molding composition composed of 100 parts by weight of A to E for EMI purposes (electromagnetic interference); furthermore mixtures of this composition with additional carbon fibers or conductivity carbon black or nickel-coated carbon fibers.

The molding composition according to the invention can also contain other additives typical and conventional for polycarbonates, SAN polymers and graft copolymers based on ASA or ABS or mixtures thereof. Examples of such additives are dyes, pigments, antistatics, antioxidants and, in particular, the lubricants necessary for processing the molding composition, e.g. in the production of moldings.

The additives (Component F) can be added in amounts of 0.05–80% by weight, based on 100 parts of the total of Components A to F, to the mixture.

In this connection processing aids and stabilizers are normally used in amounts $\geq 2\%$.

Reinforcing agents such as glass fibers, carbon fibers etc. are normally added in amounts of 5–80% based on the total of A to E.

PREPARATION OF THE MOLDING COMPOSITION

The molding composition according to the invention is prepared by mixing the components. It may be advantageous for some components to be previously mixed. It is also possible to mix the components in solution and to remove the solvent.

Examples of organic solvents suitable for Components A to E and the additives of Group F are chlorobenzene, mixtures of chlorobenzene and methylene chloride or mixtures of chlorobenzene and aromatic hydrocarbons, e.g. toluene.

The solvent mixtures can be evaporated off, for example, in evaporating extruders.

The mixing of the, for example, dry Components A, B, C., D and E, with or without F, can take place by all conventional methods. However, Components A, B, C., D and E, with or without F, are preferably mixed at 200–320° C. by the components being extruded, kneaded or rolled together, if necessary after isolation from the solution obtained in the polymerization or from the aqueous dispersion. The products of the graft copolymerization (Component B) obtained in aqueous dispersion can be coagulated, precipitated and partly dehydrated together with component E, or mixed directly as dispersions with Component C and then with the polycarbonate A and Component D, in which case Components B and E are completely dried during the mixing. It is also possible for the emulsion of Component E to be poured with degassing in an extruder into a melt of Component C, and for the other Components A, B and D to be metered in in the same extruder after the degassing.

Examples of suitable mixing units for the process according to the invention are conventional tumble mixers or stirrers.

Examples of suitable units for the melt compounding are heated internal mixers operating batchwise or continuously, screw compounders with axially oscillating screws, twin screw extruders and heated mixing rolls.

Examples of suitable units for the melt extrusion are single and twin screw extruders.

The molding composition according to the invention can be processed in ways conventional for thermoplastics, e.g. by extrusion, injection molding, calendaring, blow molding, compression or sintering; the molding compositions prepared by the process according to the invention are particularly preferably used to produce injection moldings for automobile construction, the building sector, for office machinery, electrical equipment and household appliances.

The parameters used in the following examples are determined as follows:

The median particle size and the particle size distribution were determined from the cumulative mass distribution. The median particle size is in every case based on weight and was determined using an analytical ultracentrifuge by the method of W. Scholtan and H. Lange, Kolloid-Z. und Z. f. Polymere 250 (1972), 782–796. The ultracentrifuge measurement provides the cumulative mass distribution of the particle diameter in a sample. It is possible to deduce from this the percentage by weight of the particles which have a diameter equal to or smaller than a particular size. The median particle diameter, which is also called the $d_{50}$ of the cumulative mass distribution, is defined as the particle diameter greater than that of 50% by weight of the particles and smaller than that of 50% by weight of the particles. The width of the particle size distribution of the rubber particles is characterized not only by the $d_{50}$ but also by the $d_{10}$ and $d_{90}$ which are derived from the cumulative mass distribution and are defined in a similar way to the $d_{50}$ but relate to 10 and 90% of the particles respectively. The quotient Q $$Q = \frac{d_{90} - d_{10}}{d_{50}}$$

represents a measure of the width of the particle size distribution.

The melt flow index MFI in g/10 min was measured by the DIN 53 735 method at 260° C. with a loading of 5 kg.

The Vicat softening point B/50 was determined on specimens of dimensions 50×6×4 mm by the DIN 53 460 method.

The relative solution viscosity $\eta_{rel}$ of the polycarbonate employed was measured in a 0.5% strength solution in methylene chloride at 23° C.

The viscosity number VN of the copolymers C was determined in a 0.5% strength solution in dimethylformamide at 23° C.

The products described hereinafter were used to prepare molding compositions according to the invention and compositions for comparative tests.

COMPONENT A

A commercial polycarbonate based on bisphenol A with a relative solution viscosity of 1.30 ml/g was employed as component B-1.

COMPONENT B

The following graft copolymers were employed as Component B-1.

(b) Preparation of a large-particle graft copolymer B ($a_1$) 16 parts of butyl acrylate and 0.4 part of tricyclodecenyl acrylate in 150 parts of $H_2O$, with the addition of 1 part of the sodium salt of a $C_{12}$–$C_{18}$-paraffin sulfonic acid, 0.3 part of $K_2S_2O_8$, 0.3 part of $NaHCO_3$ and 0.15 part of sodium pyrophosphate, were heated to 60° C. with stirring. 10 min after the reaction started, a mixture of 82 parts of n-butyl acrylate and 1.6 parts of tricyclodecenyl acrylate was added over the course of 3 hours. After the addition was complete the mixture was stirred for a further 1 hour. The resulting latex had a solids content of 40%. The median particle size (based on weight) was found to be 76 nm. The particle size distribution was narrow (quotient Q=0.29).

($b_1$) 1.5 parts of the latex prepared in stage ($a_1$) were mixed with 50 parts of water and 0.1 part of potassium persulfate and then, over the course of 3 hours, on the one hand a mixture of 49 parts of butyl acrylate and 1 part of tricyclodecenyl acrylate, and on the other hand a solution of 0.5 part of the sodium salt of a $C_{12}$–$C_{18}$-paraffinsulfonic acid in 25 parts of water, were added at 60° C. After the addition was complete, polymerization was continued for 2 hours. The resulting latex of the crosslinked poly(butyl acrylate) had a solids content of 40%. The median particle size (based on weight) was found to be 430 nm. The particle size distribution was narrow (Q=0.1).

($b_2$) 150 parts of this latex were mixed with 20 parts of styrene and 60 parts of water and stirred while a further 0.03 part of potassium persulfate and 0.05 part of lauryl peroxide were added, and then the mixture was heated at 65° C. for 3 hours. The dispersion obtained from this graft copolymerization was then polymerized with 20 parts of a mixture of styrene and acrylonitrile in the ratio 75:25 for a further 4 hours. The product was then precipitated from the dispersion with a calcium chloride solution at 95° C. and was separated off, washed with water and dried in a stream of hot air. The degree of grafting of the graft copolymer was found to be 35%; the median particle size of the latex was 510 nm.

Preparation of B-2

As B-1, but 20 parts of styrene were replaced by 20 parts of polymerizable phosphate Ia, and 20 parts of styrene/acrylonitrile were replaced by 10 parts of a 75/25 styrene/acrylonitrile mixture and 10 parts of polymerizable phosphate Ia

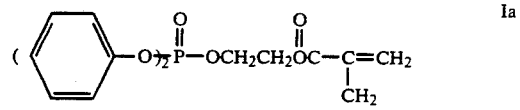

COMPONENT C

A continuous solution polymerization by a process as described, for example, in the Kunststoff-Handbuch, Vieweg-Daumiller, Volume V (Polystyrene), Carl-Hanser Verlag, Munich, 1969, page 124, lines 12 et seq., was used to prepare the following copolymer:

C-1: styrene/acrylonitrile = 81/19

C-2: styrene/acrylonitrile/phosphate Ia in the ratio 65/15/20.

COMPONENT D

Triphenyl phosphate

COMPONENT E

Aqueous PTFE dispersion with a solids content of 60% by weight and a particle size of 0.23 μm. Density of the sintered solid 2.3 g/cm³ (DuPont, Type 30 N).

PROCESSING

The PTFE emulsion was mixed with the emulsion of the particular graft copolymer B and stabilized with 0.4% by weight, based on the polymer solids, of phenolic antioxidants. The mixtures were coagulated with an aqueous solution of magnesiumsulfate at 85–95° C., filtered and washed until virtually free of electrolytes. Most of the water was then removed by centrifugation, and the powder was dried at 100° C.

The powder of Components B and E was mixed with the other Components A, C and D in dry form in a fluid mixer and extruded at 260° C. in a twin screw extruder supplied by Werner & Pfleiderer (ZSK 30). The test specimens were produced from this by injection molding at 250° C.

TABLE 1

| Mixtures with phosphate in the shell and in the SAN matrix | | | | | | | |
|---|---|---|---|---|---|---|---|
| | 1 | 2 | 3 | 4 | 5 | 6 | 7 |
| A | 64.65 | 64.65 | 64.65 | 64.65 | 64.65 | 64.65 | 64.65 |
| B-1 | — | — | — | — | — | — | 8 |
| B-2 | 8 | 8 | 8 | 8 | 8 | 8 | — |
| C-1 | 9 | 9 | 9 | 9 | 9 | 9 | 16 |
| C-2 | 6 | 7 | 8 | 10 | 12 | 14 | — |
| D | 12 | 11 | 10 | 8 | 6 | 4 | 11 |
| E | 0.35 | 0.35 | 0.35 | 0.35 | 0.35 | 0.35 | 0.35 |
| MFI | >250 | >250 | >250 | 174 | 113 | 93 | 53 |

7 (C): Comparative test

We claim:

1. A molding composition containing, based on the total of A to E,

A: 40–90% by weight of a halogen-free polycarbonate A,

B: 5-40% by weight of at least one halogen-free graft copolymer B assembled from copolymerized units (based on B) of B1: 40-80% by weight of an elastomer B1 with a glass transition temperature below 0° C., B2: 20-60% by weight of a shell B2 of, based on B2, B21: 40-98% by weight of styrene, α-methylstyrene, nuclear-substituted styrene and/or $C_1$-$C_8$-alkyl (meth)acrylate, B22: 50-1% by weight of (meth)acrylonitrile and/or maleic anhydride, B23: 1-50% by weight of an organic phosphorus compound of the formula (I)

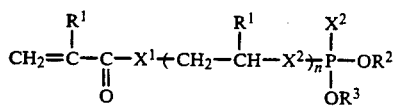

where $R^1$ is H or $CH_3$, $R^2$ and $R^3$ are each independently halogen-free $C_1$-$C_8$-alkyl or halogen-free unsubstituted or substituted $C_6$-$C_{20}$-aryl, $X^1$, $X^2$ and $X^3$ are each O, S, NR (where R is hydrogen or halogen-free $C_1$-$C_8$-alkyl) and n is 0 to 10

C: 5-40% by weight of a halogen-free thermoplastic coplymer C of, based on C,

C1: 50-95% by weight of styrene, α-alkylstyrene, nuclear-substituted styrene and/or $C_1$-$C_8$-alkyl (meth)acrylate, C2: 4-50% by weight of (meth)acrylonitrile and/or maleic anhydride, C3: 1-46% by weight of a halogen-free phosphorus compound of the formula (I), D: up to 20% by weight of a halogen-free phosphorus compound of the formula (II)

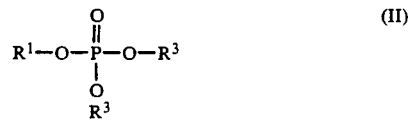

where $R^1$, $R^2$ and $R^3$ are each independently halogen-free $C_1$-$C_8$-alkyl or halogen-free unsubstituted or substituted $C_6$-$C_{20}$-aryl, E: up to 5% by weight of a polytetrafluoroethylene with a median particle size of from 0.05 to 20 μm.

2. A molding composition containing
50-85% by weight of A,
5-25% by weight of B,
5-40% by weight of C,
4-15% by weight of D,
0.01-2% by weight of E.

* * * * *